US006956599B2

(12) United States Patent
Lim et al.

(10) Patent No.: US 6,956,599 B2
(45) Date of Patent: Oct. 18, 2005

(54) REMOTE MONITORING APPARATUS USING A MOBILE VIDEOPHONE

(75) Inventors: Chae-Whan Lim, Taegu-Kwangyok-shi (KR); Soon-Jin Kim, Kumi-shi (KR)

(73) Assignee: Samsung Electronics Co., Ltd. (KR)

(*) Notice: Subject to any disclaimer, the term of this patent is extended or adjusted under 35 U.S.C. 154(b) by 259 days.

(21) Appl. No.: 10/023,105

(22) Filed: Dec. 17, 2001

(65) Prior Publication Data

US 2002/0113861 A1 Aug. 22, 2002

(30) Foreign Application Priority Data

Feb. 16, 2001 (KR) .......................................... 2001-7670

(51) Int. Cl.⁷ ............................................... H04N 7/14
(52) U.S. Cl. ............................... 348/14.02; 348/14.05; 348/143; 348/211.2; 455/41.2
(58) Field of Search .................... 348/14.01–14.05, 348/14.07, 14.12, 143, 153, 158, 159, 211.1, 211.2, 211.8, 211.99; 709/204; 340/539.1, 539.15–539.17, 539.25, 540–541; 715/753; 455/403, 404.1, 404.2, 556.1, 420, 411.2, 557; 379/38, 44, 102.01, 102.02, 102.06; 345/659–660

(56) References Cited

U.S. PATENT DOCUMENTS

| | | | | |
|---|---|---|---|---|
| 5,652,849 A | * | 7/1997 | Conway et al. | .............. 715/719 |
| 5,717,379 A | * | 2/1998 | Peters | .................... 340/539.25 |
| 5,786,746 A | * | 7/1998 | Lombardo et al. | ...... 340/286.07 |
| 5,838,250 A | * | 11/1998 | Maekawa | .................... 348/143 |
| 5,893,037 A | * | 4/1999 | Reele et al. | ............. 455/556.1 |
| 6,085,112 A | * | 7/2000 | Kleinschmidt et al. | .. 455/556.1 |
| 6,094,213 A | * | 7/2000 | Mun et al. | ............... 348/14.05 |
| 6,297,846 B1 | * | 10/2001 | Edanami | ..................... 348/239 |
| 6,317,039 B1 | * | 11/2001 | Thomason | ................... 340/505 |
| 6,346,950 B1 | * | 2/2002 | Jouppi | ........................ 345/660 |
| 6,369,847 B1 | * | 4/2002 | James et al. | ............. 348/14.01 |
| 6,380,968 B1 | * | 4/2002 | Alexander et al. | ....... 348/14.05 |
| 6,400,903 B1 | * | 6/2002 | Conoval | ...................... 396/56 |
| 6,433,683 B1 | * | 8/2002 | Robinson | .................... 340/540 |
| 6,633,231 B1 | * | 10/2003 | Okamoto et al. | ....... 340/539.11 |
| 6,809,759 B1 | * | 10/2004 | Chiang | .................... 348/211.2 |
| 2001/0043271 A1 | * | 11/2001 | Kawano | ..................... 348/211 |
| 2002/0013161 A1 | * | 1/2002 | Schaeffer et al. | ........... 455/557 |

* cited by examiner

Primary Examiner—George Eng
(74) Attorney, Agent, or Firm—Dilworth & Barrese LLP

(57) ABSTRACT

Disclosed is a remote monitoring apparatus comprising a control/monitoring unit located in a user's place for remote monitoring; a mobile communication terminal with a camera for photographing a subject, for performing a call service and an image processing/transmission service including an operation of photographing a subject with the camera; and a dynamic support located in a remote place to be monitored and having the mobile communication terminal mounted on the dynamic support itself, for controlling a posture of the mounted mobile communication terminal and positional movement of the dynamic support itself upon receiving a posture/position control command on the mounted mobile communication terminal from the control/monitoring unit via the wireless Internet and the mounted mobile communication terminal.

4 Claims, 5 Drawing Sheets

REMOTE MONITORING APPARATUS USING A MOBILE VIDEOPHONE

PRIORITY

This application claims priority to an application entitled "Remote Monitoring Apparatus using a Mobile Videophone" filed in the Korean Industrial Property Office on Feb. 16, 2001 and assigned Ser. No. 2001-7670, the contents of which are hereby incorporated by reference.

BACKGROUND OF THE INVENTION

1. Field of the Invention

The present invention relates generally to a remote monitoring system, and in particular, to an apparatus for performing remote monitoring using a mobile videophone.

2. Description of the Related Art

In the conventional remote monitoring system, a camera is mounted on a remotely situated pan-and-tilt pedestal, which is controlled by wire or controlled wirelessly with a remote controller within a limited radius. A remote place's picture photographed by the camera mounted on the pan-and-tilt pedestal is transmitted by wire to a monitoring terminal such as a computer.

However, the conventional remote monitoring system costs a great deal for installing the camera on the pan-and-tilt pedestal and needs a lot of additional equipments for controlling the remotely situated camera. In addition, the monitoring terminal is connected to the camera by wire in order for a user to view the remote place picture photographed by the camera through the monitoring terminal. This makes it difficult to install and maintain the conventional remote monitoring system. Moreover, when the number of remote places to be monitored through the conventional remote monitoring system increases, the scale of the conventional remote monitoring system is unacceptably enlarged.

SUMMARY OF THE INVENTION

It is, therefore, an object of the present invention to provide an apparatus for performing remote monitoring using a mobile videophone.

It is another object of the present invention to provide a remote monitoring apparatus for inexpensively performing remote monitoring and searching using simple equipments.

To achieve the above and other objects, there is provided a remote monitoring apparatus comprising a control/monitoring unit located in a user's place for remote monitoring; a mobile communication terminal with a camera for photographing a subject, for performing a call service and an image processing/transmission service including an operation of photographing a subject with the camera; and a dynamic support located in a remote place to be monitored and having the mobile communication terminal mounted on the dynamic support itself, for controlling a posture of the mounted mobile communication terminal and positional movement of the dynamic support itself upon receiving a posture/position control command on the mounted mobile communication terminal from the control/monitoring unit via the wireless Internet and the mounted mobile communication terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
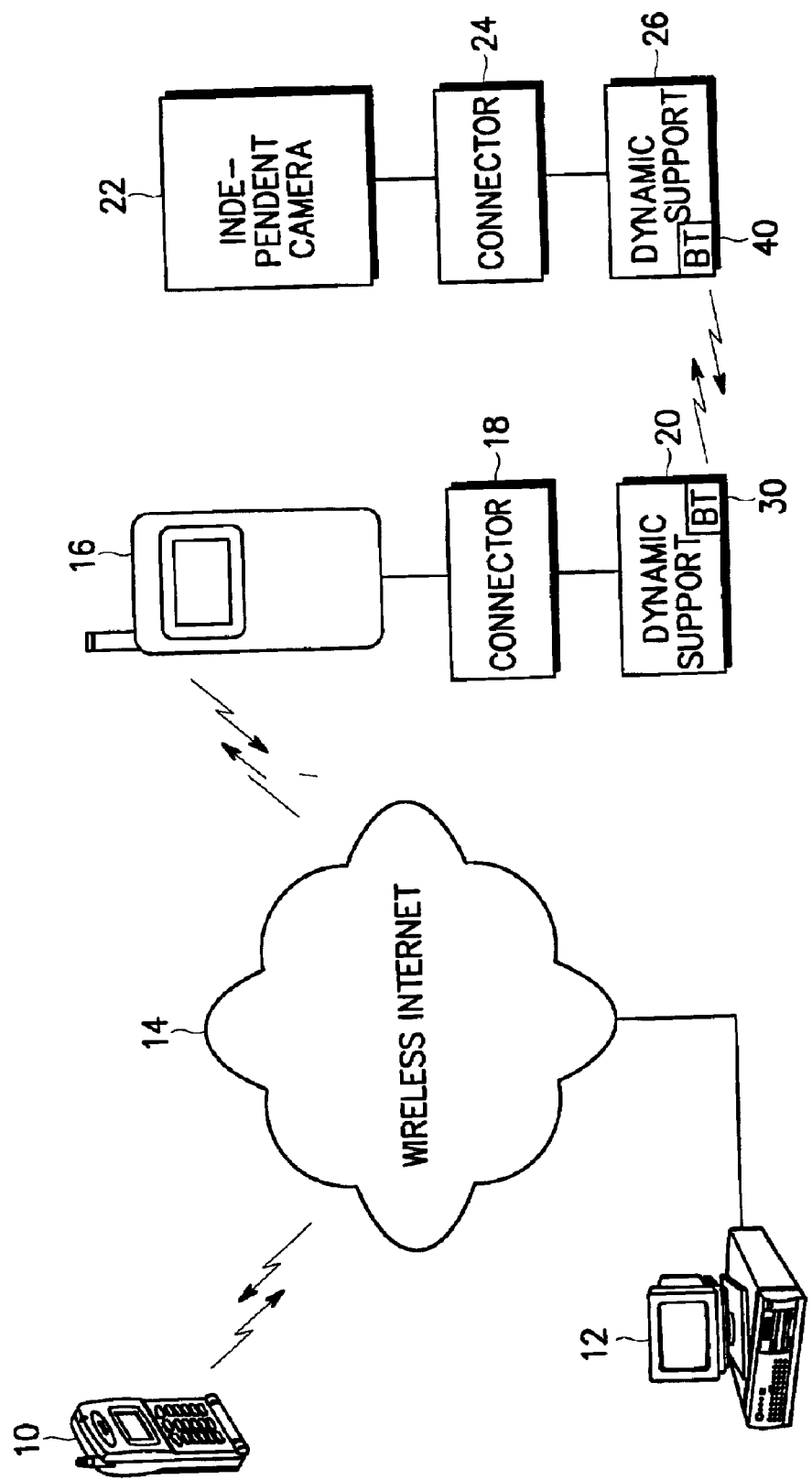
FIG. 1 is a schematic diagram of a remote monitoring system according to an embodiment of the present invention.

FIG. 1 is a schematic diagram of a remote monitoring system according to an embodiment of the present invention. Referring to FIG. 1, mobile videophones 10 and 16 each have a camera unit and can compress and transmit a moving picture through long-distance wireless communication. The mobile videophone 16 mounted on a dynamic support 20 is a mobile communication terminal carried by a user, and is used for photographing and transmitting a spot picture of a remote place. An independent camera 22 mounted on a dynamic support 26 is additionally used for photographing and transmitting a spot picture of a remote place. The mobile videophone 16 and the independent camera 22 perform a local (short-distance) wireless communication in between using Bluetooth™ modules (BTs) 30 and 40 mounted in the dynamic supports 20 and 26. In an embodiment of the present invention, the BT 30 serves as a master and the BT 40 serves as a slave.

The mobile videophone 10 or a PC (Personal Computer) 12 is a control/monitoring unit for remote monitoring, which controls a posture of the mobile videophone 16 and positional movement of the dynamic support 20 through a wireless Internet 14 and demands the mobile videophone 16 to photograph and transmit a still or moving picture of a desired remote place. In addition, the mobile videophone 10 or the PC 12 controls a posture of the independent camera 22 and positional movement of the dynamic support 26 via the wireless Internet 14, the mobile videophone 16, a connector 18, the dynamic support 20, the BT 30 and the BT 40. The independent camera 22 is controlled by the mobile videophone 10 or the PC 12 to photograph and transmit a still or moving picture about a desired remote place, via the wireless Internet 14, the mobile videophone 16, a connector 18, the dynamic support 20, the BT 30, the BT 40 and a connector 24. Moreover, the mobile videophone 10 or the PC 12 displays on its own display a remote place's picture photographed with the mobile videophone 16 and then received through the wireless Internet.

It is preferable that a WAP (Wireless Application Protocol), a Web access protocol in a wireless environment, is used in the wireless Internet 14. The WAP is a wireless protocol, which enables the access to the wire Internet through personal mobile equipments such as a mobile telephone and is now becoming an application protocol of the future IMT-2000 system. A WAP programming model and a WAP protocol stack according to a WAP specification defined through a WAP forum are well known to those skilled in the art.

The connector 18 is a physical device, which physically connects the mobile videophone 16 and the dynamic support 20 to enable the communication between the two. The connector 24 is a physical device, which physically connects the independent camera 22 and the dynamic support 26 to enable the communication between the two.

Upon receiving a command for controlling a posture of the mobile videophone 16 and positional movement of the dynamic support 20 from the mobile videophone 10 or the PC 12 via the wireless Internet 14, the mobile videophone 16 transmits the received command to the dynamic support 20 through the connector 18. The dynamic support 20 then performs an operation corresponding to the received command. In addition, upon receiving a command to photograph and transmit a still or moving picture about a desired remote place from the mobile videophone 10 or the PC 12 via the wireless Internet 14, the mobile videophone 16 performs an operation corresponding to the received command. Moreover, upon receiving a command for controlling a posture of the independent camera 22 and positional movement of the dynamic support 26 from the mobile videophone 10 or the PC 12 via the wireless Internet 14, the mobile videophone 16 transmits the received command to the dynamic support 26 through local wireless communication using the BT 30 and the BT 40. The dynamic support 26 then performs an operation corresponding to the received command.

Figure 2:
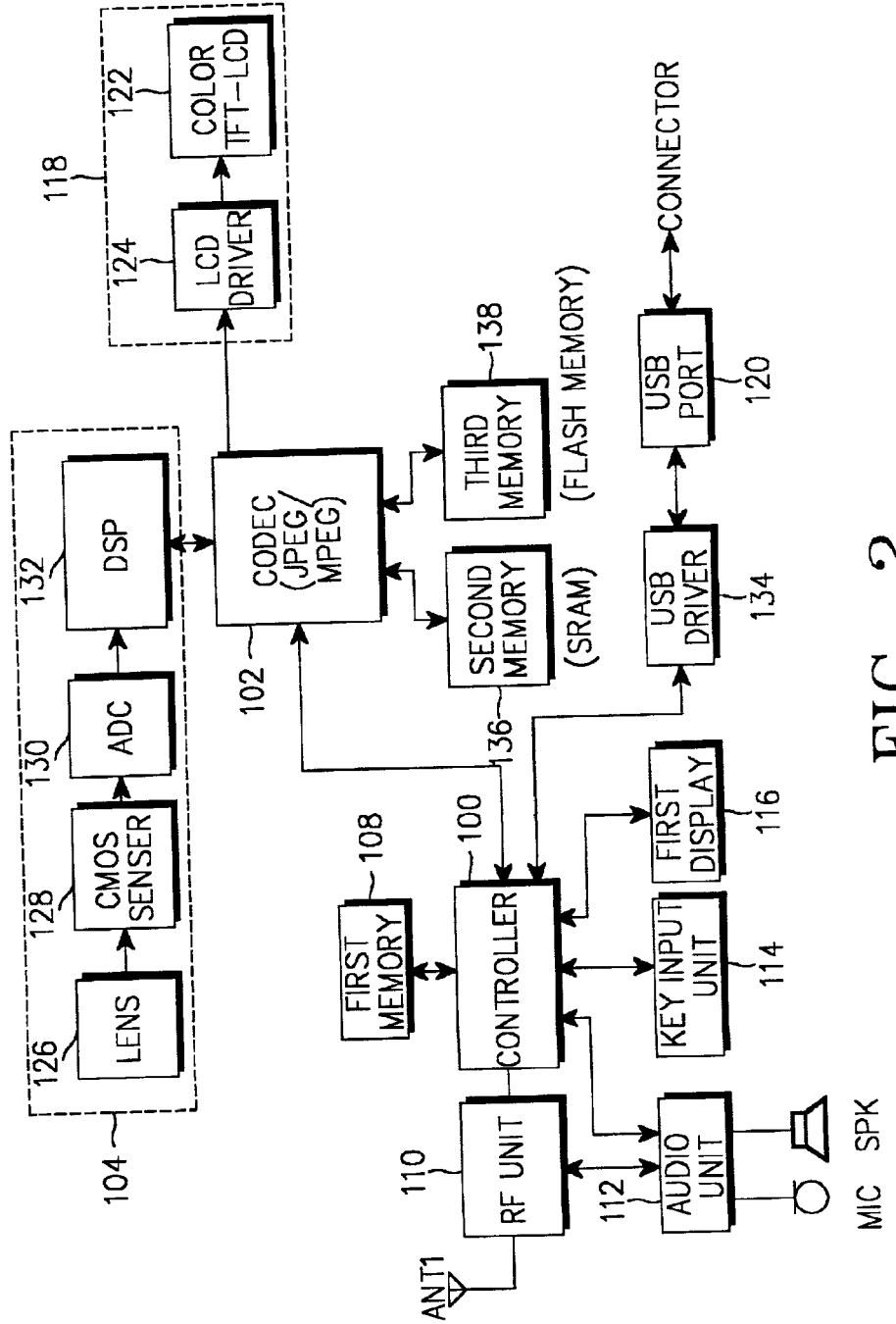
FIG. 2 is a block diagram of an exemplary mobile videophone according to an embodiment of the present invention.

FIG. 2 is a block diagram of an example of the mobile videophones 10 and 16 illustrated in FIG. 1, which includes a camera unit 104 for photographing a subject. Referring to FIG. 2, a controller 100 controls an overall operation of the mobile videophone 10 or 16 for performing various multimedia functions including a voice call function and a subject photography function. In addition, when the user demands a moving picture mode, the controller 100 makes a CODEC 102 decompress and decode still or moving picture data received from the wireless Internet. In a camera mode, the controller 100 makes the CODEC 102 compress still or moving picture data outputted from the camera unit 104 in the JPEG (Joint Picture Expert Group)/MPEG (Moving Picture Expert Group) format and transmits the compressed data to the wireless Internet 14. A first memory 108 stores a program for controlling an overall operation of the mobile videophone 10 or 16, and stores in its predetermined memory area the data input and output when an overall operation of the mobile videophone is performed under the control of the controller 100.

An RF (Radio Frequency) unit 110 includes a high frequency processing part, an intermediate frequency processing part and a baseband processing part. The RF unit 110 processes, step by step in the above three parts, various multimedia data including voice data and still/moving picture data received through an antenna ANT1 from an external network such as the wireless Internet 14, thereby generating a baseband signal which can be processed in the controller 100. In addition, the RF unit 110 modulates various still/moving picture data outputted from the camera unit 104 and compressed by the CODEC 102 into a high frequency signal and transmits the high frequency signal to the wireless Internet 14.

Under the control of the controller 100, an audio unit 112 modulates a voice signal inputted through a microphone MIC into a radio signal and demodulates a radio signal received through the RF unit 110 into an audible signal to output the audible signal through a speaker SPK. In addition, the audio part 112 demodulates a radio audio signal included in still/moving data received from the RF unit 110 in a moving picture mode and outputs the demodulated signal through the SPK. A key input unit 114 has a plurality of numeral keys and a plurality of function keys for a moving picture service and a camera photography function, and generates and outputs key data corresponding to keys pressed by the user to the controller 100. A first display 116 includes a black-and-white LCD (Liquid Crystal Display) for displaying in a general call mode various kinds of information about the mobile videophone in a gray level, and displays the key data generated in the key input unit 114 and the various information signals of the controller 100. A second display 118 comprises a color TFT-LCD (Thin Film Transistor-LCD) 122 for displaying a moving picture and a LCD driver 124 for driving the color TFT-LCD 122 to display, under the control of the controller 100, various kinds of still/moving picture data outputted from the CODEC 102, and displays in color the still/moving picture data received from the cameral unit 104 or the wireless Internet 14 in the camera mode or the moving picture mode.

The camera unit 104 captures a subject picture image, and processes a subject picture image photographed in the camera mode into still/moving picture data to provide the processed data to the CODEC 102. More specifically, the subject picture image is provided to a CMOS (Complementary Metal-Oxide Semiconductor) sensor 128 through a lens 126. Then, the CMOS sensor 128 converts a subject light signal passed through the lens 126 into an electrical signal (a photographed picture signal), and performs camera functions such as an exposure function, a gamma function, a gain control function, a white valence function and a color matrix function. An ADC (Analog-to-Digital Converter) 130 converts the photographed picture signal outputted from the CMOS sensor 128 into a digital signal to output the converted photographed picture signal to a DSP (Digital Signal Processor) 132. The DSP 132 processes the converted photographed picture signal into an NTSC (National Television System Committee) or PAL (Phase Alternating by Line) picture signal.

Under the control of the controller 100, the CODEC 102 converts the photographed picture signal (Y, C) generated from the camera unit 104 in the JPEG or MPEG format to then compress the resultant signal at a given ratio, and decompresses and decodes the compressed still/moving picture data received from the wireless Internet 14 to then provide the resultant signal to the second display 118. The still/moving picture data wirelessly received from an external network such as the wireless Internet 14 may be sill/moving picture data received from an engaged counterpart terminal, various kinds of VOD (Video On Demand) data received from Web servers and image contents servers connected to a mobile switching center (not shown), or still/moving picture data corresponding to the remote place's spot picture photographed with the independent camera 22 or the mobile videophone 16. A second memory 136 connected to the CODEC 102 is usually embodied using an SRAM (Static Random Access Memory), and stores a program for performing various operations of the CODEC 102. A third memory 138 is usually embodied using a flash memory, and stores a still picture of the picture data received through the lens 126 of the camera unit 104 and the wireless Internet 14.

A USB (Universal Serial Bus) driver 134 and a USB port 120 are used for communication between the mobile videophone 16 and the dynamic support 20. Specifically, the USB driver 134 converts data corresponding to a posture control command on the mobile videophone 16 and a position control command on the dynamic support 20 in accordance with the USB standard, and transmits/receives the data at a high rate of 12 Mbps or low rate of 1.5 Mbps. The USB port 120 is a connection port for a cable used to transmit the data received from the controller 100 to the dynamic support 20, and the data received through the connector 18 to the controller 100.

Figure 3:
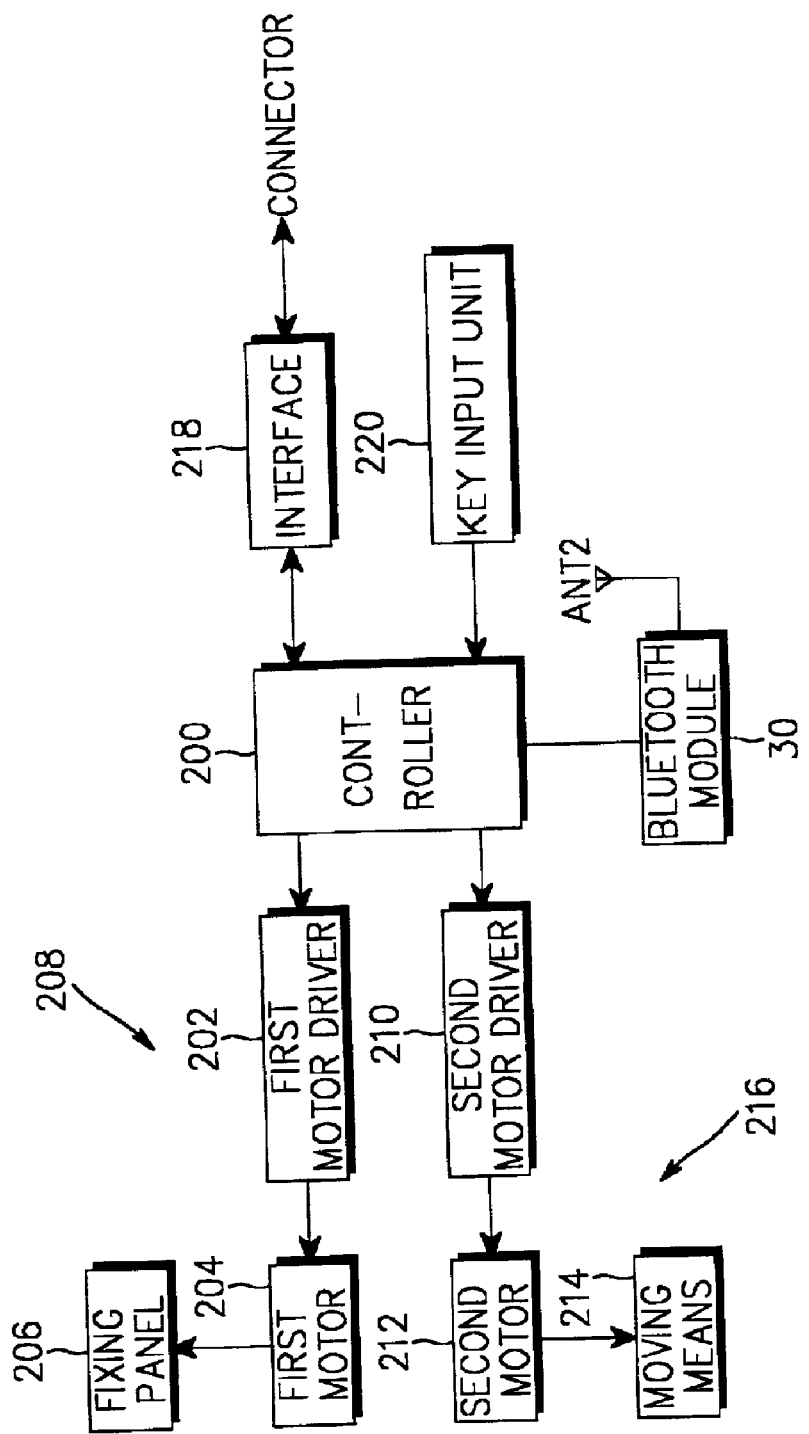
FIG. 3 is a detailed block diagram of a dynamic support according to an embodiment of the present invention; and]

FIG. 3 is a detailed block diagram of the dynamic support 20 on which the mobile videophone 16 is mounted. The dynamic support 20 is dynamically movable according to the posture control command on the mobile videophone 16 and the position control command on the dynamic support 20 itself, which are received from the controller 100 through the connector 18. In addition, the dynamic support 20 transmits a posture control command on the independent camera 22 and a position control command on the dynamic support 26, both provided from the controller 100 through the connector 18, to the dynamic support 26 through the BT 30.

Referring to FIG. 3, the dynamic support 20 comprises a controller 200, a first motor driver 202, a first motor 204, a fixing panel 206, a second motor driver 210, a second motor 212, a moving means 214, an interface 218, a key input unit 220 and the BT 30. The first motor driver 202, the first motor 204 and the fixing panel 206 form a block 208 for controlling the posture of the mobile videophone 16 under the control of the controller 200. The second motor driver 210, the second motor 212 and the moving means 214 constitute a block 216 for moving the positions of the dynamic supports 20 and 26 under the control of the controller 200. The interface 218 is used for communicating with the mobile videophone 16 by the connectors 18 and 24, and comprises elements corresponding to the USB driver 134 and the USB port 120 of the mobile videophone 16 illustrated in FIG. 2. The key input unit 220 includes keys for manipulating the dynamic support 20.

The BT 30 has an antenna ANT2, and performs a local wireless communication with the dynamic support 26 under the control of the controller 200. As shown in FIG. 1, upon receipt of the posture control command on the independent camera 22 and the position control command on the dynamic support 26 through the connector 18 from the mobile videophone 16, the dynamic support 20 transmits through the BT 30 the two commands to the BT 40 of the dynamic support 26 on which the independent camera 22 is mounted.

A structure of the dynamic support 26 is identical to that of the dynamic support 20 except that the fixing panel 206 used in the dynamic support 26 has a structure suitable for mounting the independent camera 22 instead of the mobile videophone 16. In addition, for a case where the independent camera 22 does not have a moving-picture compressing function, it is preferable that the controller 200 additionally has an image processing function for the moving-picture compressing function or the dynamic support 22 has an additional unit for performing the moving-picture compressing function.

The controller 200 drives the fixing panel 206 and/or the moving means 214 according to the posture control command on the mobile videophone 16 and/or the position control command on the dynamic support 20 that are received through connector 18 and the interface 218. A wheel is a typical example of the moving means 214.

Referring to FIG. 1 again, the mobile videophone 16 is physically connected to the dynamic support 20 by the connector 18 and a connection port situated at a lower end of the mobile videophone 16. Here, the connection port of the mobile videophone 16 comprises a USB port (i.e., the USB port 120) for securing a sufficient bandwidth for transmission of moving picture data and an existing connection port enabling ascertainment of whether the mobile videophone 20's battery is charge and whether the mobile videophone 20 is mounted on the dynamic support 20. If both the USB port and the existing connection port are connected to the dynamic support 20, the controller 200 performs the operation described above with reference to FIG. 3.

In addition, the independent camera 22 is physically connected to the dynamic support 26 through a USB port for transmission of moving picture data from the independent camera 22 to the dynamic support 26. If the independent camera 22 is physically connected to the dynamic support 26 through the USB port, the dynamic support 26 compresses the moving picture data received from the independent camera 22 at a given ratio and transmits the compressed moving picture data to the dynamic support 20 through local wireless communication.

The independent camera 22 is an additional device, which is used when it is difficult to perform a remote monitoring operation using only a spot picture photographed by the mobile videophone 16. The mobile videophone 16 receives a command relating to an operation of the independent camera 22 from the mobile videophone 10 or the PC 12 and transmits the command to the independent camera 22 through the BTs 30 and 40 of the dynamic supports 20 and 26. The independent camera 22 then performs an operation corresponding to the command.

Figure 4:
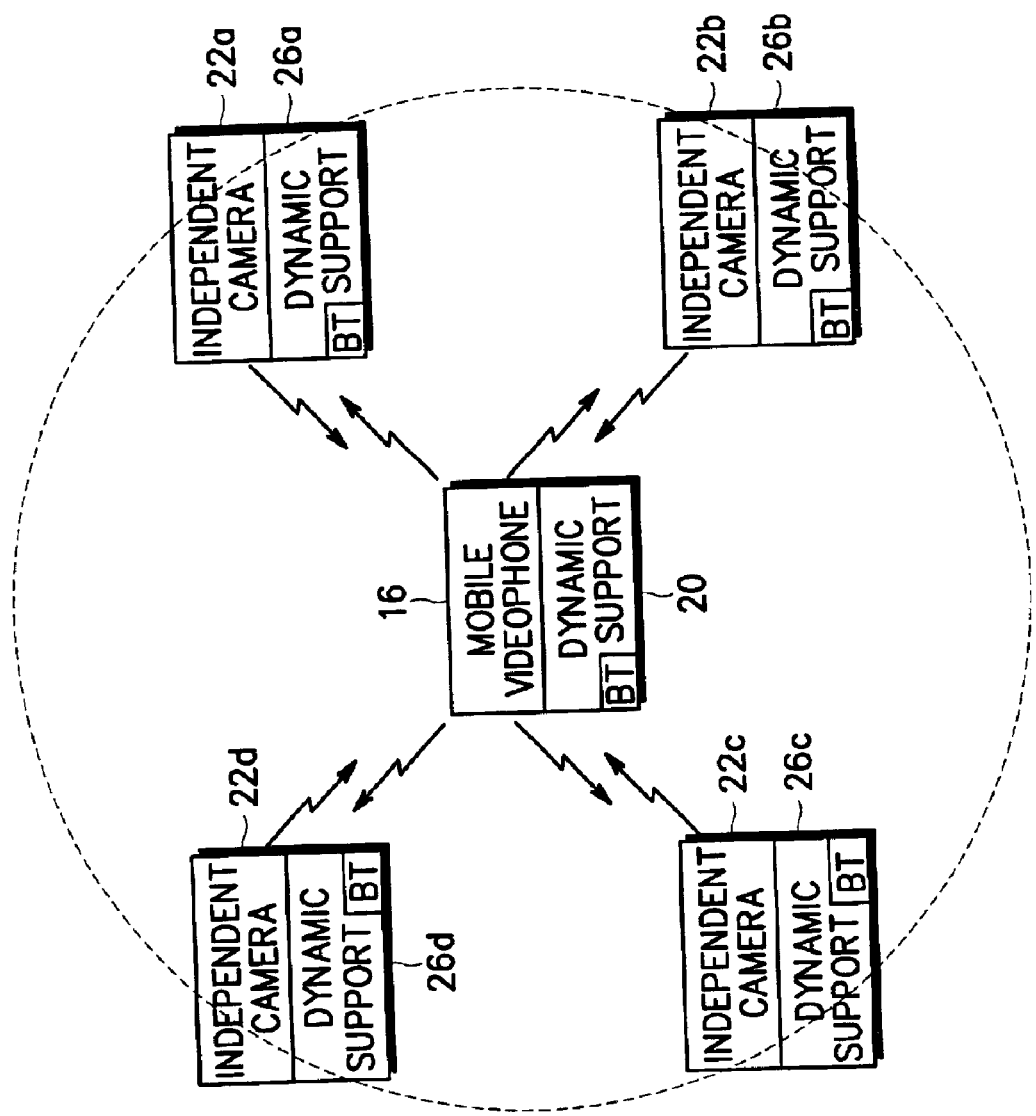
FIG. 4 is a schematic diagram illustrating local (short-distance) wireless communication between dynamic supports, according to an embodiment of the present invention.

FIG. 4 is a schematic diagram illustrating local wireless communication between dynamic supports, according to an embodiment of the present invention. Referring to FIG. 4, a remote monitoring operation is performed using independent cameras 22a, 22b, 22c and 22d mounted on dynamic supports 26a, 26b, 26c and 26d. Here, the BT 30 of the dynamic support 20 serves as a master, and BTs of the dynamic supports 26a, 26b, 26c and 26d serve as slaves.

Figure 5:
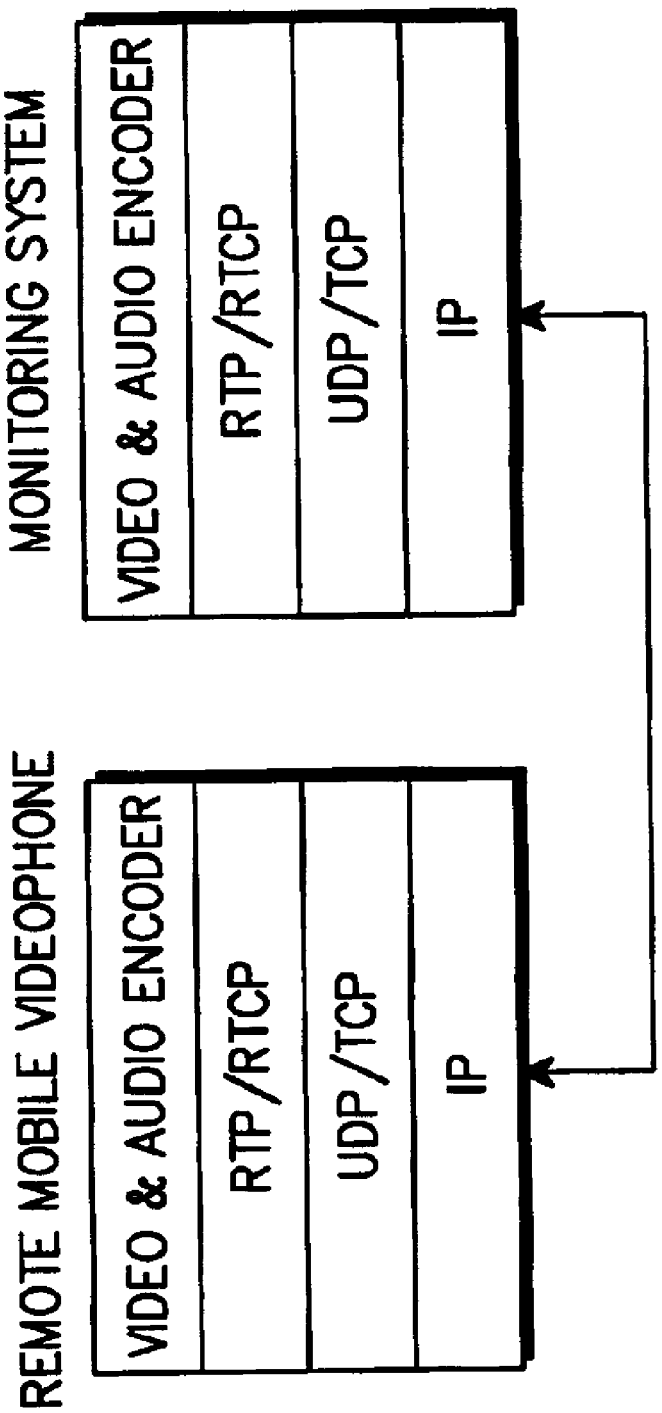
FIG. 5 is a diagram illustrating a protocol stack for real-time communication of a moving picture between a remotely situated (remote) mobile videophone and a monitoring system.

FIG. 5 is a diagram illustrating a protocol stack for real-time communication of a moving picture between a remote mobile videophone (i.e., the mobile videophone 16) and a monitoring system (i.e., the mobile videophone 10 or the PC 12). An RTP/RTCP (Real-time Transport Protocol/RTP Control Protocol) is used for the real-time communication of the moving picture. The RTP/RTCP is an IETF (Internet Engineering Task Force) standard protocol for real-time data transmission and real-time data transmission control. Referring to FIG. 5, the protocol stack comprises an IP (Internet Protocol) layer, a UDP/TCP (User Data Protocol/Transmission Control Protocol) layer on the IP layer, an RTP/RTCP layer on the UDP/TCP, and a video & audio encoder layer on the RTP/RTCP layer.

An operation according to an embodiment of the present invention will be described in detail herein below with reference to FIGS. 1 to 5.

If an operator (or monitor) commands the mobile videophone 16 to photograph and transmit a moving picture about a desired remote place, using the mobile videophone 10 or the PC 12, then the command is transmitted to the mobile videophone 16 through the wireless Internet 14. Upon receipt of the command, the mobile videophone 16 photographs the desired remote place and compresses the photographed moving picture data using the CODEC 102. The photographed moving picture is transmitted to the mobile videophone 10 or the PC 12 through the wireless Internet 14. The transmitted moving picture is displayed on a display of the mobile videophone 10 or a monitor of the PC 12. If the operator desires to monitor the state of the remote place in detail, he gives a posture control command on the mobile videophone 16 and/or a position control command on the dynamic support 20 using a key input unit of the mobile videophone 10 or the PC 12. The posture control command on the mobile videophone 16 and/or the position control command on the dynamic support 20 are (is) transmitted to the dynamic support 20 via the wireless Internet 14, the mobile videophone 16 and the connector 18. Depending on the posture control command and/or the position control command, the dynamic support 20 properly adjusts the posture of the camera of the mobile videophone 16 and/or the position of the dynamic support 20 itself.

Meanwhile, when the operator desires to see another nearby place which cannot be monitored through the mobile videophone 16, he gives a command that the independent camera 22 located nearby the mobile videophone 16 be operated to monitor the other nearby place, using the videophone 10 or the PC 12. That is, if the operator commands the independent camera 22 to photograph and transmit a moving picture of the nearby place, using the mobile videophone 10 or the PC 12, then the command is transmitted to the mobile videophone 16 through the wireless Internet 14. The command transmitted to the mobile videophone 16 is transmitted to the dynamic support 20 through the connector 18 and then transmitted to the dynamic support 26 through a local wireless communication between the BT 30 and the BT 40. The command transmitted to the dynamic support 26 is transmitted to the independent camera 22 through the connector 24. Upon receipt of the command, the independent camera 22 photographs the nearby place and transmits the photographed moving picture to the dynamic support 26 through the connector 24. The dynamic support 26 then compresses the transmitted moving picture using its interior image-processing unit (or the image processing function of the controller 200). The compressed moving picture is transmitted to the dynamic support 20 through a local wireless communication between the BT 40 and the BT 30 and then transmitted to the mobile videophone 16 through the connector 18. The mobile videophone 16 transmits the compressed moving picture to the mobile videophone 10 or the PC 12 through the wireless Internet. Then, the mobile videophone 10 or the PC 12 decompresses the compressed moving picture and displays the decompressed moving picture through its display.

If the operator desires to monitor the state of the nearby place in detail, he gives a posture control command on the independent camera 22 and/or a position control command on the dynamic support 26 using a key input unit of the mobile videophone 10 or the PC 12. The posture control command on the mobile videophone 16 and/or the position control command on the dynamic support 20 are (is) transmitted to the dynamic support 26 via the wireless Internet 14, the mobile videophone 16, the connector 18, the dynamic support 20, the BT 30 and the BT 40. Depending on the posture control command and/or the position control command, the dynamic support 26 properly adjusts the posture the independent camera 22 and/or the position of the dynamic support 26 itself so as to enable the independent camera 22 to photograph the nearby place in detail.

In order to successfully perform a remote monitoring operation, it is preferable that a control operation of the mobile videophone 16 and the independent camera 22 is performed in real time. In the embodiment of the present invention, posture control operations of the mobile videophone 16 and the independent camera 22 and position control operations of the dynamic supports 20 and 26 are performed in real time according to the RTP illustrated in FIG. 5. In order to discriminate between moving picture data and a control command, different headers are added to the moving picture data and the control commands. In the real-time control operations of the present invention, after the operator gives a command of positional movement or rotation on the mobile videophone 16 or the independent camera 22, an additional performance time for the command is not allotted. In the embodiment of the present invention, an absolute coordinate value is allotted to the command of the positional movement or rotation, so that a delay between the operator's control operation and the dynamic support's response can be decreased and thereby the operator's inconveniences in manipulating the monitoring system are decreased. For example, when the operator presses a key for rotating a view line direction of the mobile videophone 16's camera counterclockwise for two seconds, a control command corresponding to the key is not continuously transmitted to the dynamic support 20 for the mobile videophone 16 during the two seconds. Instead, a rotation angle corresponding to the two seconds is displayed on the operator's monitor, and information about the rotation angle is included in the control command and transmitted to the dynamic support 20. When the independent camera 22 is used for the remote monitoring operation, the dynamic support 20 serves as a master and the dynamic support 26 serves as a slave. In this case, various control signals are communicated between the dynamic support 20 and the dynamic support 26 through Bluetooth wireless communication, so as to control the posture of the independent camera 22 and the position of the dynamic support 26.

As described above, a remote monitoring system according to the present invention makes it possible to inexpensively monitor a remote place using a mobile videophone anyone can carry. In addition, the remote monitoring system makes it possible to remotely monitor a vivid state of a dangerous spot using a dynamic support situated in the dangerous spot and a mobile videophone mounted on the dynamic support.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A remote monitoring apparatus comprising:
   a control/monitoring unit for remote monitoring;
   a mobile communication terminal for performing a call service, for performing an image processing/transmission service, and for receiving a posture and position control command over a wireless network;
   an independent camera for photographing a subject;
   a first dynamic support for mounting the mobile communication terminal and for receiving the posture and position control command from the mounted mobile communication terminal, and for performing local wireless communication of retransmitting the posture and position control command; and
   a second dynamic support located in a remote place to be monitored and having the independent camera detachably mounted on the second dynamic support, for controlling a posture of the mounted camera and positional movement of the second dynamic support upon receiving the retransmitted posture and position control command via the first dynamic support for the mounted mobile communication terminal.

2. The apparatus as claimed in claim 1, further comprising a USB connector for performing transmission of moving picture data from the independent camera to the dynamic support.

3. A remote monitoring apparatus comprising:

a control/monitoring unit for remote monitoring;

a mobile communication terminal including a camera unit for photographing a first subject, for performing a call service and an image processing/transmission service including an operation of photographing the first subject with the camera unit;

an independent camera for photographing a second subject;

a first dynamic support located in a remote place to be monitored and having the mobile communication terminal mounted on the first dynamic support, for controlling a posture of the mounted mobile communication terminal and positional movement of the first dynamic support upon receiving a first posture and position control command on the mounted mobile communication terminal from the control/monitoring unit via a wireless Internet and the mounted mobile communication terminal and, upon receiving a second posture and position control command from the control/monitoring unit via the wireless Internet and the mounted mobile communication terminal, wirelessly transmitting the second posture and position control command to the independent camera; and a second dynamic support on which the independent camera is mounted, for wirelessly receiving the second posture and position control command from the first dynamic support and controlling a posture of the mounted independent camera and positional movement of the second dynamic support, wherein the first and second dynamic supports wirelessly communicate via respective Bluetooth™ modules.

4. The apparatus as claimed in claim 3, further comprising a connector for performing communication between the mounted independent camera and the second dynamic support.

* * * * *